United States Patent
Swendsen

(10) Patent No.: US 10,190,304 B2
(45) Date of Patent: Jan. 29, 2019

(54) LIQUID-CONTACT ACTIVATED MUSICAL INSTRUMENT

(71) Applicant: Daniel Charles Swendsen, Minneapolis, MN (US)

(72) Inventor: Daniel Charles Swendsen, Minneapolis, MN (US)

(\*) Notice: Subject to any disclaimer, the term of this patent is extended or adjusted under 35 U.S.C. 154(b) by 292 days.

(21) Appl. No.: 14/805,110

(22) Filed: Jul. 21, 2015

(65) Prior Publication Data
US 2015/0322663 A1 Nov. 12, 2015

Related U.S. Application Data

(63) Continuation-in-part of application No. 13/856,871, filed on Apr. 4, 2013, now Pat. No. 9,087,499.

(60) Provisional application No. 61/620,072, filed on Apr. 4, 2012.

(51) Int. Cl.
| | |
|---|---|
| G10H 3/00 | (2006.01) |
| E03D 13/00 | (2006.01) |
| G06F 17/30 | (2006.01) |
| G06F 3/16 | (2006.01) |
| G10H 1/26 | (2006.01) |
| H04R 1/02 | (2006.01) |

(52) U.S. Cl.
CPC .......... *E03D 13/005* (2013.01); *G06F 3/165* (2013.01); *G06F 17/3074* (2013.01); *G10H 1/26* (2013.01); *G10H 2220/351* (2013.01); *H04R 1/028* (2013.01)

(58) Field of Classification Search
CPC ... E03D 13/005; G06F 3/165; G06F 17/3074; G10H 1/26; G10H 2220/351; H04R 1/028
USPC ........................................ 4/661; 84/723, 743
See application file for complete search history.

(56) References Cited

U.S. PATENT DOCUMENTS

| | | | | |
|---|---|---|---|---|
| 4,773,863 A * | 9/1988 | Douglas, III | ......... | E03D 13/005 273/349 |
| 5,809,590 A * | 9/1998 | Williams | ............... | A47K 11/12 4/300.3 |
| 5,867,848 A * | 2/1999 | Ort | .......................... | E03D 13/00 4/661 |
| 6,385,796 B1 * | 5/2002 | Muir, Jr. | .................. | E03D 13/00 4/304 |
| 6,513,173 B1 * | 2/2003 | Sykes | ..................... | A47K 11/12 4/301 |
| 6,750,773 B2 * | 6/2004 | Higgins | .................. | E03C 1/281 200/61.04 |
| 6,779,206 B1 * | 8/2004 | Sykes | .................... | A47K 17/00 4/301 |
| 6,908,392 B2 * | 6/2005 | Friedman | ............... | A47K 11/00 273/348 |
| 7,194,776 B1 * | 3/2007 | Lastuka | .................. | E03D 13/00 340/603 |

(Continued)

*Primary Examiner* — Jeffrey Donels
(74) *Attorney, Agent, or Firm* — Mitchell Hamline IP Clinic

(57) ABSTRACT

Devices, systems, and methods that make music in response to be contacted by a stream of liquid are disclosed. A music making device may include a sensor to detect when a stream of liquid is substantially in contact with the sensor. The sensor may produce an indicator signal at or around the time the liquid substantially contacts the sensor. A circuit may generate an electrical pulse in response to detecting the indicator signal. The electrical pulse may be coupled to a speaker which converts the electrical pulse into sound.

12 Claims, 12 Drawing Sheets

(56) References Cited

U.S. PATENT DOCUMENTS

| | | | |
|---|---|---|---|
| 7,798,907 B2* | 9/2010 | Piccionelli | A63F 9/0204 |
| | | | 273/342 |
| 8,544,341 B2* | 10/2013 | Grumbles | E03D 13/005 |
| | | | 4/661 |
| 2008/0098505 A1* | 5/2008 | Casari | E03D 13/00 |
| | | | 4/309 |
| 2013/0102371 A1* | 4/2013 | Silva | A63F 9/24 |
| | | | 463/7 |
| 2013/0221617 A1* | 8/2013 | Freriks | E03D 13/005 |
| | | | 273/371 |

* cited by examiner

US 10,190,304 B2

LIQUID-CONTACT ACTIVATED MUSICAL INSTRUMENT

RELATED APPLICATIONS

This application claims priority to U.S. Provisional Application Ser. No. 61/620,072 entitled Liquid-Contact Activated Musical Instrument, filed Apr. 4, 2012, which is incorporated herein by reference in its entirety.

TECHNICAL FIELD

The present invention relates generally to musical instruments.

BACKGROUND

Prior attempts at urinal entertainment focus on visual entertainment. In some cases, for example, a graphic display is placed above the urinal and the person standing at the urinal is presented with advertisements or other forms of visual entertainment.

SUMMARY

The devices and methods described herein relate generally to liquid-activated sound generation. Some examples are directed toward urinal entertainment. Some examples are directed to an interactive musical urinal cake holder. Some examples are directed towards a combination of interactive musical urinal cake holders. Some examples are directed towards combinations of urinal cake holders and graphic displays. Some examples are directed to a human waste receptacle with interactive musical capabilities. Some examples are directed to a urinal with interactive musical capabilities that is supplemented with graphic displays and/or lighting capabilities. In some embodiments the modified urinal cake holders, urinal cake holder adapters and urinals allow for the strategic placement and/or audio playback of advertisements.

In one example, a system comprises a first sensor operable to determine that a stream of liquid in contact therewith meets or exceeds a threshold and emit a first signal, wherein the first sensor is associated with a device configured to be disposed in a human waste receptacle. The system further comprises a circuit in electrical communication with the first sensor, wherein the circuit is operable to receive the first signal associated with the stream of liquid meeting or exceeding the threshold, and to generate a first electrical pulse in response to the received first signal. The system further comprises a speaker in electrical communication with the circuit, wherein the speaker is operable to receive the electrical pulse and emit a sound in response thereto.

In one example, a method of making music comprises detecting, using a first sensor, a stream of liquid, producing, using the first sensor, a first indicator signal in response to detecting the stream of liquid. The method further comprises detecting, using a circuit, the first indicator signal, and generating, using the circuit, an electrical pulse in response to detecting the indicator signal.

DETAILED DESCRIPTION

Figure 1:
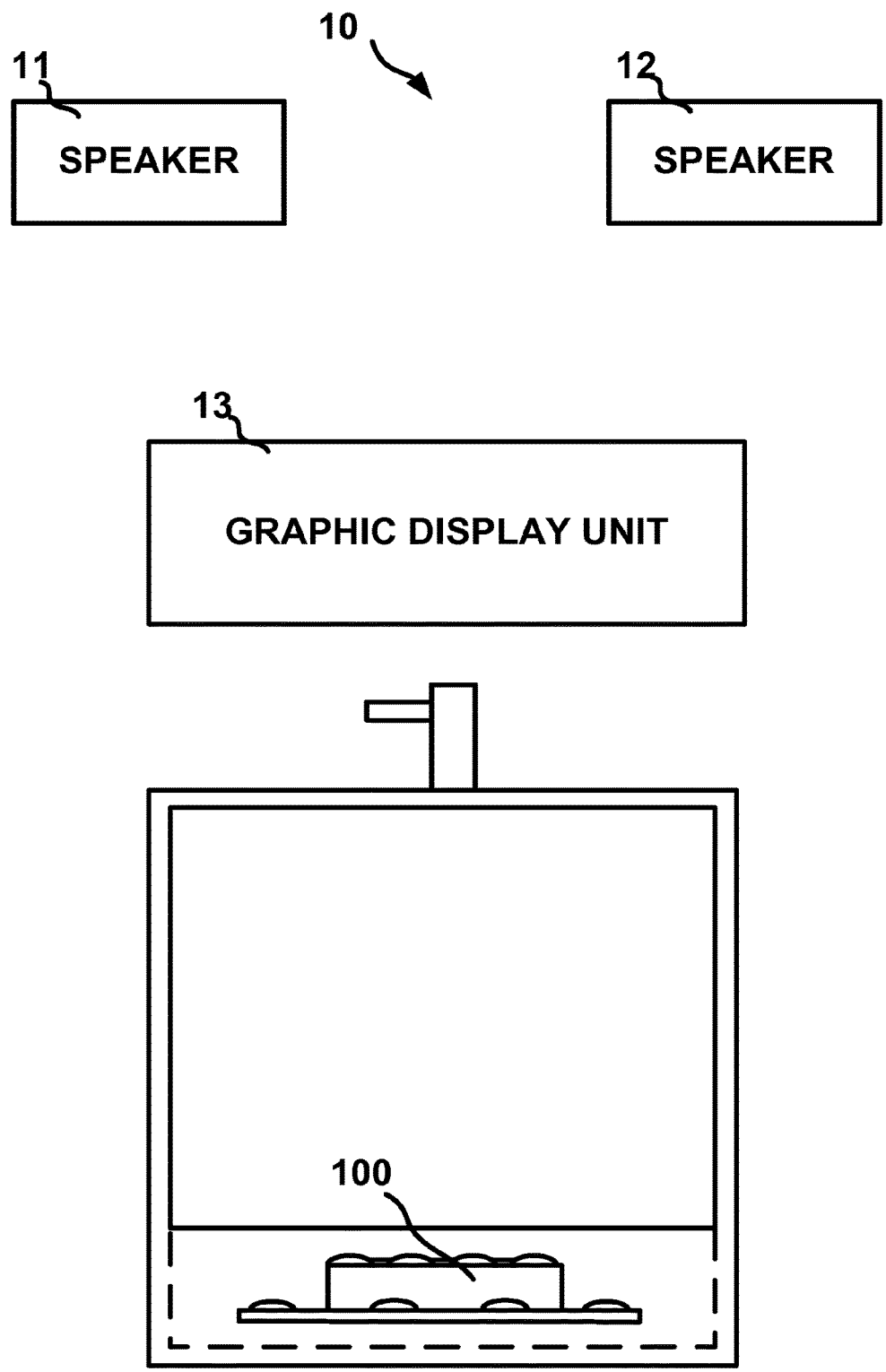
FIG. 1 is a front view diagram of a music-making system according to an example embodiment.

In the following description, reference is made to the accompanying drawings that form a part hereof, and in which are shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, tablet computer, smartphone, or other computer system.

The present disclosure, in one or more embodiments, is directed toward a liquid-activated music making device for sensing when a stream of urine contacts it and produces music in response thereto. In some embodiments, the device may be placed in a urinal or toilet such that a user may make music while they urinate. In some embodiments, the device may be placed in a receptacle configured as a potty training device. In some embodiments, the device may be configured as a pet training device (e.g., placed on the floor). For example, a restaurant or bar owner may place the device in their urinals such that the patrons of their bathrooms may experience the joy of making music while urinating. In some cases, the music making device may create sounds like an audio advertisement for a business or a business theme song or jingle. In other cases, different patrons may use different devices which may make different tones. In some cases, in order to produce a correct sound a device may require the user to aim and redirect their urine. In some embodiments, the device may create music and may allow for friendly competition and keeping score. The music may be heard in the bathroom and/or piped into the bar or restaurant, for example. As such the device may make the act of urinating more enjoyable. Using the device may expose the activity of urinating to other patrons in an establishment in a pleasant manner. In bars, in particular, where alcohol consumption may lead to substantial levels of urinating, the device may be particularly in demand. Uses and other advantages of the device are also available. For example, in some embodiments the device may be operated in or near a fountain, drinking fountain, soda fountain, waterfall, or other location or apparatus that is capable of creating or generating moving liquid.

In one example, multiple music making devices may be coupled and/or disposed in different urinals. The multiple music making devices may each produce sounds corresponding to different instruments such as, for example, a voice, a guitar, a bass, and drums. The multiple music making devices may be coordinated such that several users may substantially simulate a band playing a song, for example.

FIG. 1 is a front view diagram of a music making system 10 according to an example embodiment. Music making system 10 may include speakers 11 and 12, a graphic display unit 13, and a music making device 100.

Speakers are configured to receive signals and emit sounds in response thereto. As such most any speaker may be used, such as a common stereo speaker, overhead speakers, or other speakers. In some embodiments particular water resistant speakers may be used. In one example, speakers 11 and 12 may be disposed on a surface (e.g. a wall) near a music making device. In another example, speakers II and 12 may be disposed on, or at least partially in, a urinal in which a music making device is disposed. In another example, speakers 11 and 12 may be disposed on, or at least partially in, a music making device. In yet another example, speakers 11 and 12 may be disposed anywhere such that the sounds emanating from the speaker may be heard by at least the user of a device. In one example, speakers 11 and 12 may be chosen so as to reduce the amount of power required to operate a music making device. In one example, speakers II and 12 may be any speaker capable of transmitting sound sufficiently loud to be heard by a user of a music making device. In another example, speakers 11 and 12 may be any speaker capable of transmitting sound sufficiently loud to be heard by a user of a music making device and other people in the vicinity of the user. In another example, a music making system may include a speaker disposed in a location where a person not using the music making device, and not in the vicinity of the music making device, may hear the sound transmitted by the speaker. Speakers 11 and 12 may be coupled to circuit 128 (not shown in FIG. 1) so as to allow electrical pulses from circuit 128 to be sent to speakers 11 and 12 to be converted into sound. System 10 is depicted as having two speakers; however, any number of speakers (one or more) may be used in any system discussed herein. System 10 is depicted as including music making device 100; however, any music making device may be used.

As shown in FIG. 1, some embodiments may include a graphics display element 13. The graphics display unit 13 may be configured for interaction with a user and may include a display such as a television, computer screen, touch screen, and other types of displays. The graphics display unit 13 may include a user interface (not shown). The user interface may comprise an interactive touch screen, buttons, or any other component/s that may aid a user in selecting music to attempt to play using a music making device. Graphics display unit 13 may be coupled to music making device 100 so as to communicate to circuit 128 (not shown in FIG. 1) of music making device 100 which music or mode was chosen. During use, the display unit may provide visual stimulation responsive to the user interaction with the music making device. That is, the music making device may also drive visual effects for the graphics display, through data transmissions that may be selected by a user. It is noted that some embodiments of the present disclosure may not include a graphics display element 13.

Figure 2A:
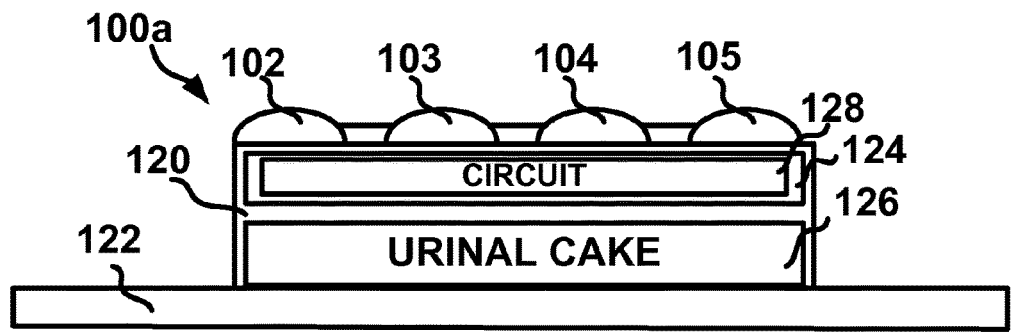
FIG. 2A is a side view diagram of a music-making device according to an example embodiment.
Figure 2B:
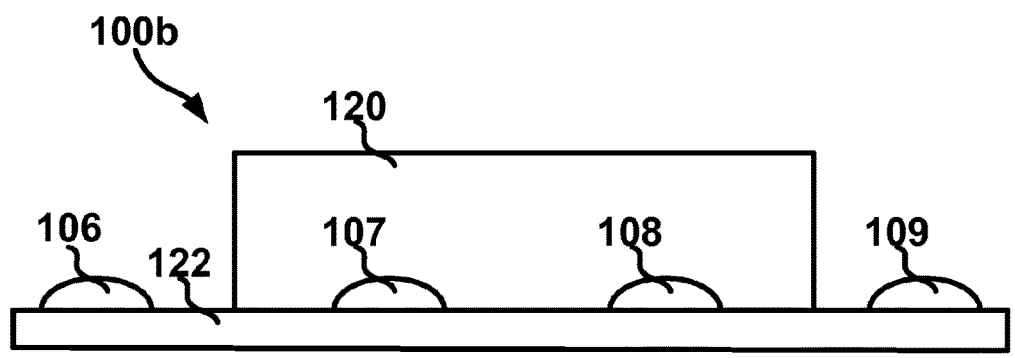
FIG. 2B is a side view diagram of a music-making device according to an example embodiment.
Figure 2C:
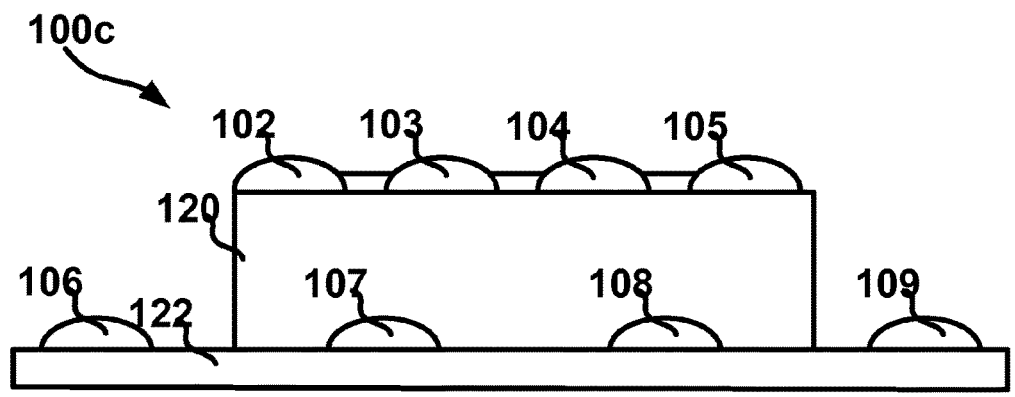
FIG. 2C is a side view diagram of a music-making device according to an example embodiment.
Figure 3A:
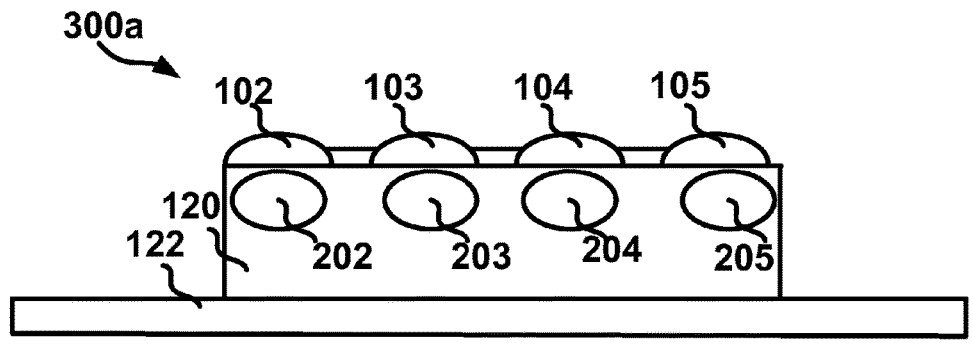
FIG. 3A is a side view diagram of a music-making device according to an example embodiment.
Figure 3B:
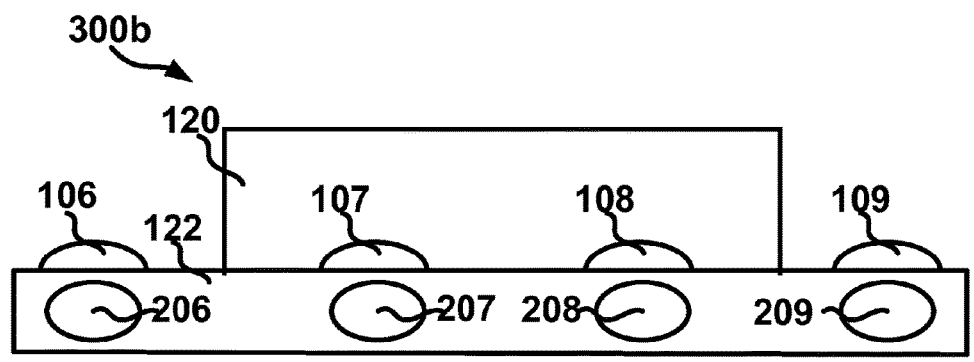
FIG. 3B is a side view diagram of a music-making device according to an example embodiment.
Figure 3C:
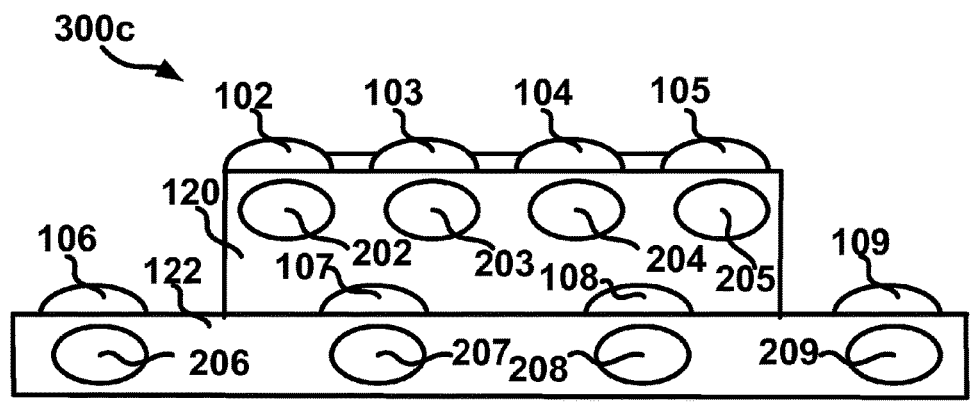
FIG. 3C is a side view diagram of a music-making device according to an example embodiment.

Music making device 100 may include sensors, lighting elements, and a circuit (e.g. as shown in FIGS. 2A-C, 3A-C, and 11). The circuit may include a processing unit (e.g. processing unit 112 of FIG. 11), a power supply (not shown), sensors (e.g. as shown in FIGS. 2A-C and 3A-C, among others), and lighting elements (e.g. as shown in FIGS. 3A-C, among others). The circuit may be electrically coupled to speakers II and 12, and the graphic display unit 13.

In one example, circuit 128 (shown in FIG. 2) may be made on a printed circuit board. In another example, circuit 128 may be substantially coated with a non-conductive liquid proof material so as to help prevent short-circuits. Circuit 128 may include sensors 102-109 and 112-119, optional lighting elements 202-209 and 212-219, a processing unit 1101, an optional lookup table 1102, an optional pulse width modulator (PWM) 1103, and an optional filter 1104. In another example, circuit 128 may include circuitry to facilitate wireless connections between the circuit and any items coupled to the circuit 128. In one example, circuit 128 may be disposed above a urinal cake cavity of a urinal cake holder, such as is shown in FIG. 2A, for example. In another example, circuit 128 may be disposed in a urinal cake attachment (e.g. adapter), such as is shown in FIG. 4B, for example. In one example, a urinal cake may be disposed in a modified urinal cake holder in such a manner so as to allow the urinal cake to still perform its desired function. While some figures may depict circuit 128 as being substantially internal to a modified urinal cake holder or a urinal cake holder attachment, in some embodiments, circuit 128 may be external to the modified urinal cake holder or the urinal cake holder attachment. For example, circuit 128 may be included in a laptop computer which is electrically coupled to a modified urinal cake holder or urinal cake holder attachment.

A display 1105 may be connected, for example mechanically or electrically, to the music making device 100. The display 1105 may display one or more digits corresponding to a score or a time. For example, a numerical score may be made to increase or decrease in response to a user's ability to cause a stream of liquid to be accurately dispersed on one or more of the sensors, or disperse a liquid across one or more of the sensors 102-109 or 112-119 within a certain amount of time. The display 1105 may include one or more Light Emitting Diode (LED), Liquid Crystal Display (LCD), or similar array configured to resemble a sports scoreboard or basketball shot clock.

In one example, sensors 102-109 and 112-119 may be pressure sensors. In another example, sensors 102-109 and 112-119 may be capable of sensing (e.g. operable to sense) other characteristics like heat, light, or others. In another example, sensors 102-109 and 112-119 may be any type of transducer operable to sense (e.g., acquire, detect, and/or measure) when a stream (e.g., at least a minimum volume or at least a minimum pressure from a volume) of liquid (e.g., urine, water, or the like) is substantially contacting the respective sensor (e.g., a volume of liquid contacting the sensor is at or above a threshold, the pressure exerted by the liquid on the sensor is at or above a threshold, or the characteristic detected by the sensor is at or above a threshold). In one example, the threshold is chosen by a manufacturer. In another example, the threshold is chosen such that a substantially direct stream of liquid in contact with the sensor triggers the sensor to create an indicator signal, while substantially indirect contact from liquid does not trigger the sensor.

In one example, lighting elements 202-209 and 212-219 may be light emitting diodes (LEDs). In another example, lighting elements 202-209 and 212-219 emit light with sufficient power and intensity for a user to see which lighting element/s is/are lit.

In one example processing unit 1101 may be any microprocessor sufficient to interpret input signals and communicate with an element (e.g. a PWM, a lookup table, and/or a filter) which is operable to create sufficient output signals to be sent to speakers 11 and 12 to create sound. In another example, processing unit 1101 may be a microcontroller.

In one example, a power supply (not shown) may be a battery, a DC power supply, or an AC power supply sufficient to supply power to music making system 010 or any other system herein.

FIG. 2A is a side view diagram of a music making device 100*a* according to an example embodiment. Music making device 100*a* may include sensors 102-105, layer (e.g. housing) 120, and base 122. Music making device 100*a* may be a modified urinal cake holder in one example. Layer 120 may be disposed on base 122 and sensors 102-105 may be disposed on layer 120. Layer 120 may include a cavity 124. Cavity 124 may be positioned (e.g. disposed) above urinal cake 126. Cavity 124 may be substantially liquid proof (e.g. wet proof) so as to prevent liquid from entering cavity 124. Cavity 124 may house electric circuit 128. FIG. 2A depicts four sensors 102-105, however, one of ordinary skill in the art should appreciate that any number of sensors could be placed on layer 120. When at least one of sensors 102-105 is struck with a stream of liquid, an indicator signal may be sent to circuit 128. Each sensor 102-105 may have its own unique indicator signal. Circuit 128 may, in response to an indicator signal, produce an electrical pulse capable of making a sound when coupled to a speaker. The sound produced may be different for each sensor 102-105. The sound produced may be a single note, two notes, a chord, a sample segment of a song, or any other sound.

In one example, circuit 128 may produce a musical note "A" when sensor 102 is struck with a stream of liquid, musical note "B" when sensor 103 is struck with a stream of liquid, musical note "C" when sensor 104 is struck with a stream of liquid, etc. Circuit 128 may produce any sound, or combination of sounds, that can, for example, mimic a sound produced by an instrument, or instruments, such as a guitar, piano, drum, bass, banjo, harmonica, Jew's harp, wood block, triangle, or any device created or adapted for the purpose of making sounds. Circuit 128 may include preprogrammed songs and sounds that may be produced depending on when a particular urinal cake sensor 102-105 is struck with liquid. For example, when a user strikes sensor 102 with a stream of liquid a song may begin playing. The song might stop playing if the user stops striking a sensor disposed on, or at least partially in, the urinal cake holder. The song might continue to play until the user stops substantially contacting any sensors 102-105 with liquid. In another example when a user strikes sensor 102 with a stream of liquid, musical note "A" is produced until at or around the time the liquid substantially stops striking sensor 102. At or around the time the user begins striking another sensor, for example 103, musical note "B" is produced until at or around the time the liquid substantially stops striking sensor 103. In another example, when a user strikes sensor 102 with a stream of liquid a song may begin playing. The song may keep playing after the stream of liquid stops striking sensor 102.

FIG. 2B is a side view diagram of a music making device 100*b* according to another example embodiment. Device 100*b* may be similar to device 100*a*, except instead of sensors 102-105 disposed on, or at least partially in layer 124, sensors 106-109 are disposed on, or at least partially in, base 122.

FIG. 2C is a side view diagram of a music making device 100*c* according to another example embodiment. Device 100*c* may be similar to devices 100*a* and 100*b* except device 100*c* can include sensors disposed on, or at least partially in, both base 122 and layer 120. In one example embodiment sensors 102 and 106 may be electrically coupled so that at or around the time either sensor 102 or 106 is substantially contacted with a stream of liquid (e.g. at or around the time either sensor 102 or 106 detects that a stream of liquid in contact with it exceeds a threshold), musical note "A" is produced. Sensors 103 and 107, 104 and 108, and 105 and 109 may each be coupled in a similar fashion. In another example embodiment sensors 102-109 are not coupled so that striking one of sensors 102-109 produces a different sound than striking any of the other sensors 102-109 on device 100*c*.

It should be appreciated that while FIGS. 2A-C depict sensors 102-105 on the surface of layer 120 and/or 106-109 on base 122, one of ordinary skill in the art should appreciate that sensors 102-109 need not be on base 120 or 122. For example, sensors 102-109 may be partially embedded in either layer 120 or base 122. Sensors 102-109 may be completely embedded in either layer 120 or base 122, for instance.

FIG. 3A is a side view diagram of a music making device 300*a* according to another example embodiment. Device 300*a* may be similar to device 100*a* except device 300*a* may include lighting elements 202-205. Lighting elements may be coupled to electric circuit 128 (not shown in FIG. 2A). Lighting elements 202-205 may be any transducer capable of converting electrical energy into light. In one example, a lighting element 202-205 may turn on (e.g., light up) to indicate that a user should strike a corresponding sensor, any of 102-105, with liquid. At or around the time the user substantially contacts the corresponding sensor with liquid a musical sound may be produced. If a sensor is struck that does not have a corresponding lighting element (light emitting element) that is lit up a sound may be produced that is different than the sound that would be played if the user were to strike the sensor with a corresponding lighting element that is lit up. The sound produced in these circumstances may be a sound that indicates that the user missed the sensor with the corresponding lit up lighting element. The sound produced in these circumstances may be a sound that is out of the key the song is in, a crashing sound, substantially no sound, or any other sound capable of creating a break in the rhythm, feel, or melody of the sounds being produced. In another example, a lighting element may turn to indicate that a user has struck a corresponding sensor, any of sensors 102-105, with liquid.

In some embodiments, a plurality of lighting elements may light up simultaneously. This may make it easier for a user to substantially contact a sensor that will produce a correct sound. In this fashion a number of different difficulty levels may be associated with a music making device. In one example difficulty level, only one lighting element may be lit at any given time and the time between changing which lighting element is lit may be relatively short. The difficulty level associated with this scenario may be considered "difficult." In another example, difficulty level multiple lighting elements may be lit at a given time and the time between changing lighting elements that are lit may be relatively short. The difficulty level associated with this scenario may be considered "medium difficult." By changing the number of lighting elements lit at a given time, and the duration between changing which lighting element/s is/are lit, numerous difficulty levels may be realized. In one embodiment, the size of the area that may be substantially contacted for a sensor to sense the contact is altered to change the difficulty level. The smaller the area that may be contacted the more difficult the level, for instance. In another embodiment, the graphics display unit 13 displays a score for the user similar to a score display at a sporting event.

In some embodiments a lighting element may light up in a computer generated random location. When substantial contact is made with the sensor associated with the lighting element, that lighting element will extinguish. The lighting element would appear in another (e.g., randomized) area and again when substantial contact is made with the associated sensor the other lighting element will extinguish and again change position. This process would continue to repeat until a predetermined time limit has expired or liquid contact has ceased for set amount of time. After the process has completed an interface system would inform the user of the amount of lighting elements extinguished and the time taken to do so.

In some embodiments, a plurality of (e.g., all) available lighting elements may light up. Once substantial contact is made with an associated sensor, a lighting element will extinguish. The process would continue and the remaining lighting elements will extinguish when sufficient contact is made with the associated sensors. The objective would be for the user to extinguish all lighting elements. This process would continue until all lighting elements are extinguished or a predetermined time limit has expired. After the process has completed an interface system would inform the user of the amount of lighting elements extinguished and the time taken to do so.

In some embodiments, a plurality of (e.g, all) available lighting elements would be extinguished. Once substantial contact is made with an associated sensor, one of the lighting elements will illuminate. The process will continue and the remaining lighting elements will also illuminate when sufficient contact is made with associated sensors. The objective is for the user to illuminate all lighting elements. This process will continue until all lighting elements are illuminated or a predetermined time limit has expired. After the process has completely an interface system would inform the user the amount of lighting elements illuminated and the time taken to do so.

Music making devices in accordance with the present disclosure may include an advertising portion. For example, a graphical display (e.g., at eye level) can display advertising and/or other content. In some embodiments, the advertising portion may include signage and/or audio messages. The advertising portion (or content may be customizable by a user, for instance.

As previously discussed, music making devices described herein may create pre-recorded sounds, such as an audio advertisement for a business, a business theme song, and/or jingle, for instance. In an example, weekly specials for a business may be played as audio responsive to a particular trigger (e.g., activation of one or more sensors). In another example, pre-recorded audio of a parent praising a child can be played responsive to the child causing sufficient contact with a particular sensor. In another example, pre-recorded audio of an owner can be played responsive to a pet causing sufficient contact with a particular sensor.

FIG. 3B is a side view diagram of a music making device 300b according to another example embodiment. Device 300b may be similar to device 300a, except sensors and lighting elements are disposed on, or at least partially in, base 122 instead of layer 120.

FIG. 3C is a side view diagram of a music making device 300c according to an example embodiment. Device 300c may be similar to devices 300a and 300b except device 300c may include sensors 102-109 and corresponding lighting elements 202-209 on, or at least partially in, both base 122 (sensors 106-109 and lighting elements 206-209) and layer 120 (sensors 102-105 and lighting elements 202-205). Lighting elements 202-205 may be coupled to lighting elements 206-209, respectively. For example, if lighting element 202 is lit up, lighting element 206 can also be lit up. Lighting elements 202-209 may each be independent of each other. That is, no other lighting element is necessarily lit when another lighting element is lit.

Figure 4A:
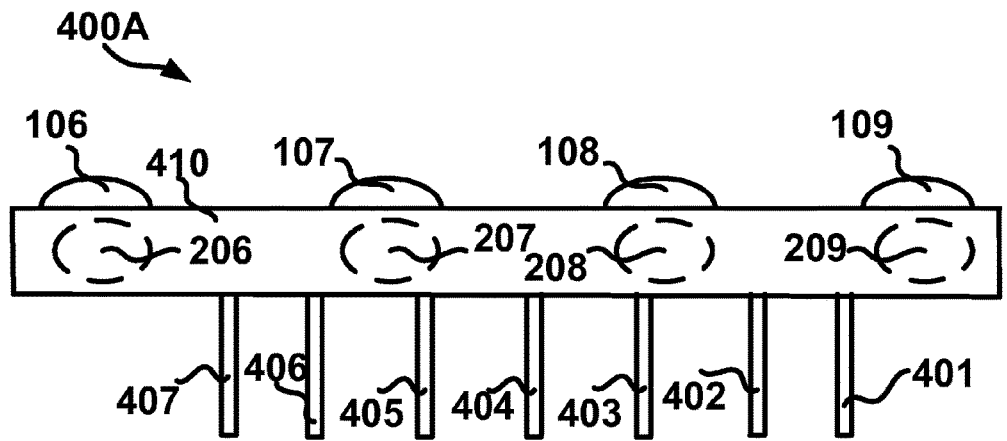
FIG. 4A is a side view diagram of a music-making device according to an example embodiment.
Figure 4B:
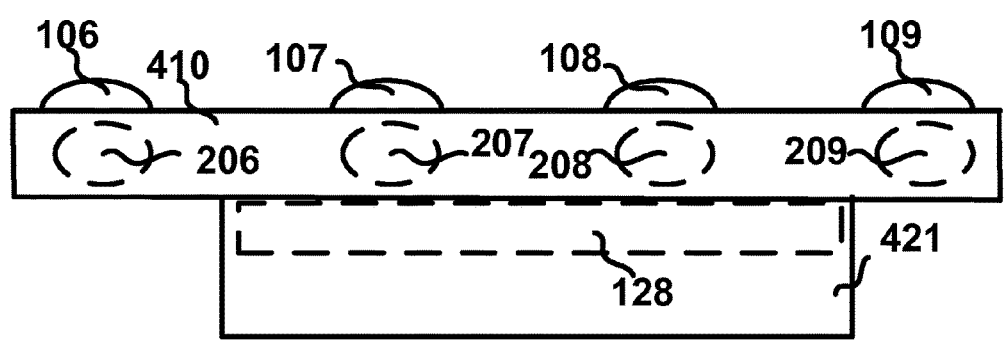
FIG. 4B is a side view diagram of a music-making device according to an example embodiment.
Figure 4C:
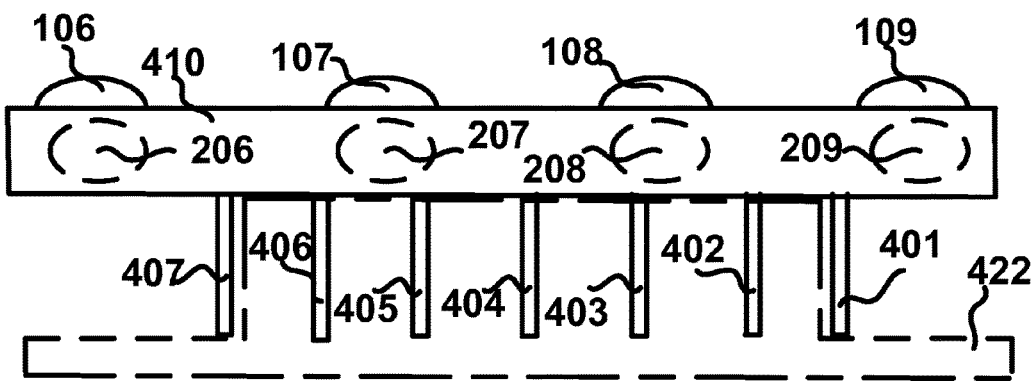
FIG. 4C is a side view diagram of a music-making device according to an example embodiment.

FIG. 4A is a side view diagram of a music making device 400a according to another example embodiment. Music making device 400a may comprise support flanges (e.g. columns, struts, stubs, or pins) 401-407, sensors 106-109, circuit 128 (not shown in FIG. 4A), a top layer 410, and may optionally comprise light emitting elements 206-209. A music making device 400a may be designed to rest on a urinal cake holder (as shown in FIG. 4C). Sensors 106-109 may be disposed on, or at least partially in, top layer 410. Optional light emitting elements 202-205 may be disposed on, or at least partially in, top layer 410. Support flanges 401-407 may be coupled to top layer 410. There are seven support flanges shown in FIG. 4A, however, it should be appreciated that various number(s) and/or shape(s) of flanges capable of elevating top layer 410 above a urinal cake holder 422 and capable of substantially supporting top layer 410 may be used in designing and making a music making device that attaches to a urinal cake holder 422. For example, FIG. 4B depicts a music making device that attaches to a urinal cake holder that has a single flange 421. Sensors 106-109, circuit 128, and optional light emitting elements 206-209 may be coupled in any fashion.

FIG. 4B is a side view diagram of a music making device 400b according to another example embodiment. Device 400b can be substantially the same as device 400a except device 400b is depicted as using a single support flange 421.

FIG. 4C is a side view diagram of device 400a placed on a urinal cake holder 422.

Figure 5:
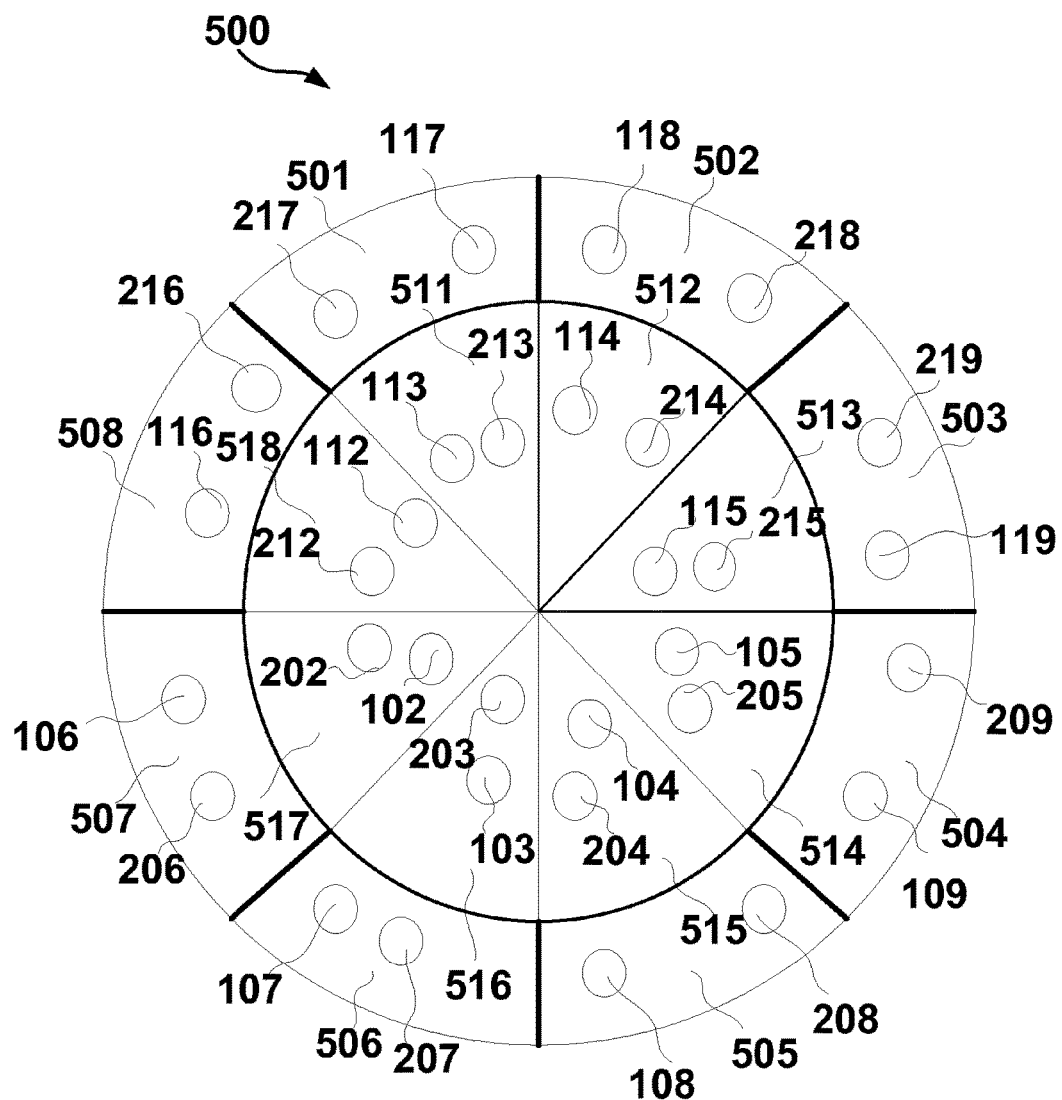
FIG. 5 is a top view diagram of a music-making device according to an example embodiment.

FIG. 5 is a top view diagram of a music making device 500 according to another example embodiment. Music making device 500 may be a modified urinal cake holder. Music making device 500 may include a lower level (shown as lower sections 501-508) and an upper level (shown as upper sections 511-518). Music making device 500 may include sensors 106-109 and 116-119 disposed on, or at least partially in, the lower level. Music making device 500 may include sensors 102-105 and 112-115 disposed on, or at least partially in the upper section. Device 500 depicts one sensor per each upper section 511-518 and each lower section 501-508, however, any number of sensors (zero or greater) may be used in each section, whether upper or lower, to create a music making device, as long as at least one section has at least one sensor disposed on, or at least partially in, it. Device 500 is depicted as having eight upper sections 511-518 and eight lower sections 501-508, however, various numbers of upper and lower sections (zero or greater, as long as there is at least one section with a sensor embedded on, or at least partially in, device 500) may be used to create a music making device.

Device 500 may include light emitting elements 202-209 and 212-219. Each upper section 511-518 and each lower section 501-508 may include a light emitting element. Each light emitting element may be isolated from other light emitting elements so as to allow each light element to light up only an individual upper or lower section (isolation not shown). Isolation from other light emitting elements may be achieved through including opaque sidewalls and an opaque bottom in each upper and lower section. The bottom of an upper or lower section may be at least partially reflective to reflect light from a light emitting element. Device 500 is depicted as having a single light emitting element per each upper section and per each lower section, however, any number of light emitting elements (zero or greater) may be used in device 500, including having more than one light emitting element per upper or lower section, or no light emitting elements.

Figure 6:
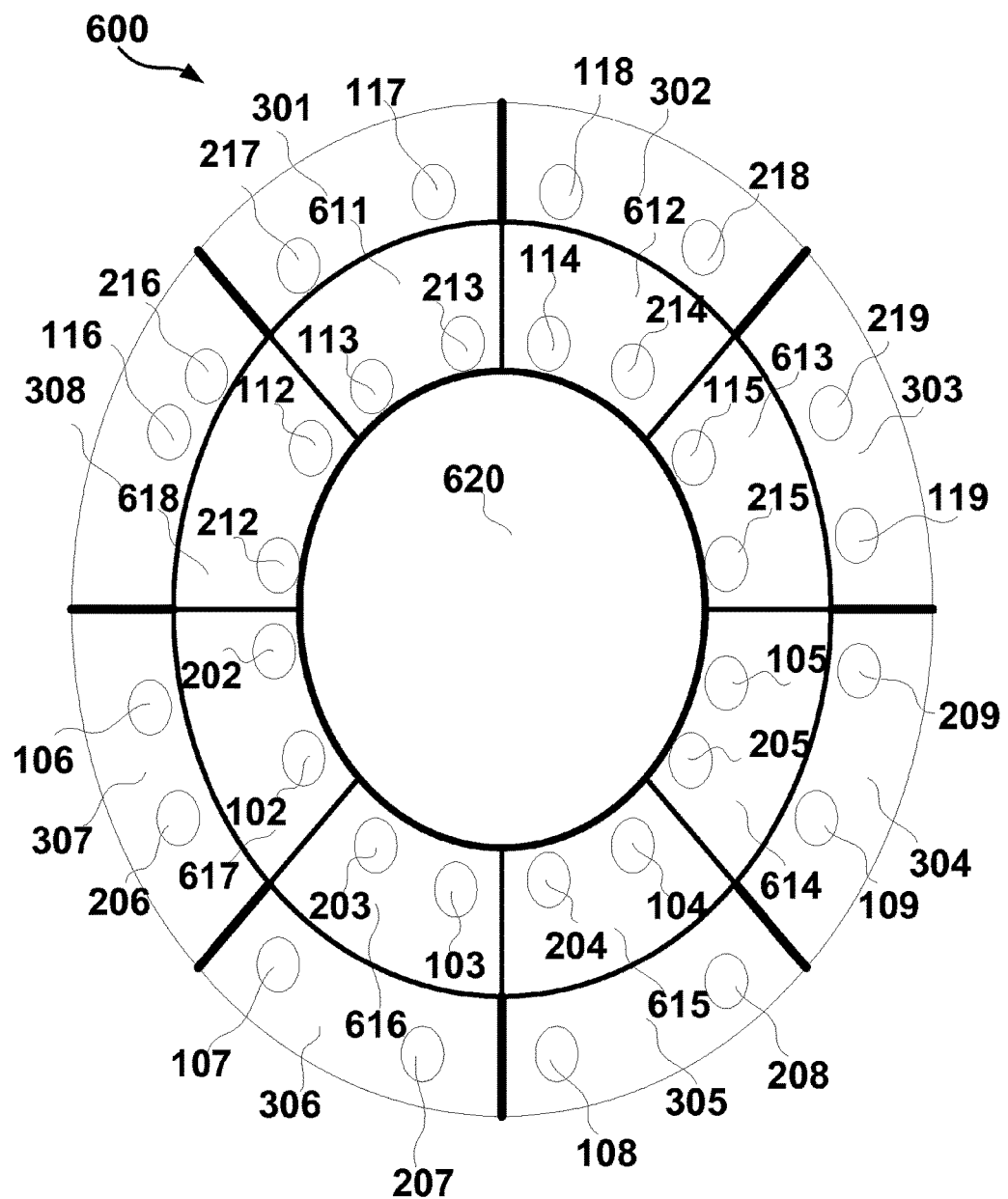
FIG. 6 is a top view diagram of a music-making device according to an example embodiment.

FIG. 6 is a top view diagram of a music making device 600 according to an example embodiment. Device 600 may be a modified urinal cake holder in one example embodiment. Device 600 may be substantially the same as device 500 except upper sections 511-518 have been replaced with upper sections 611-618 to allow for an open section 620. Open section 620 may be used to display a message to a user. The message may, for example, be an advertisement, a greeting, a picture, and/or a combination of these messages and/or others.

Figure 7:
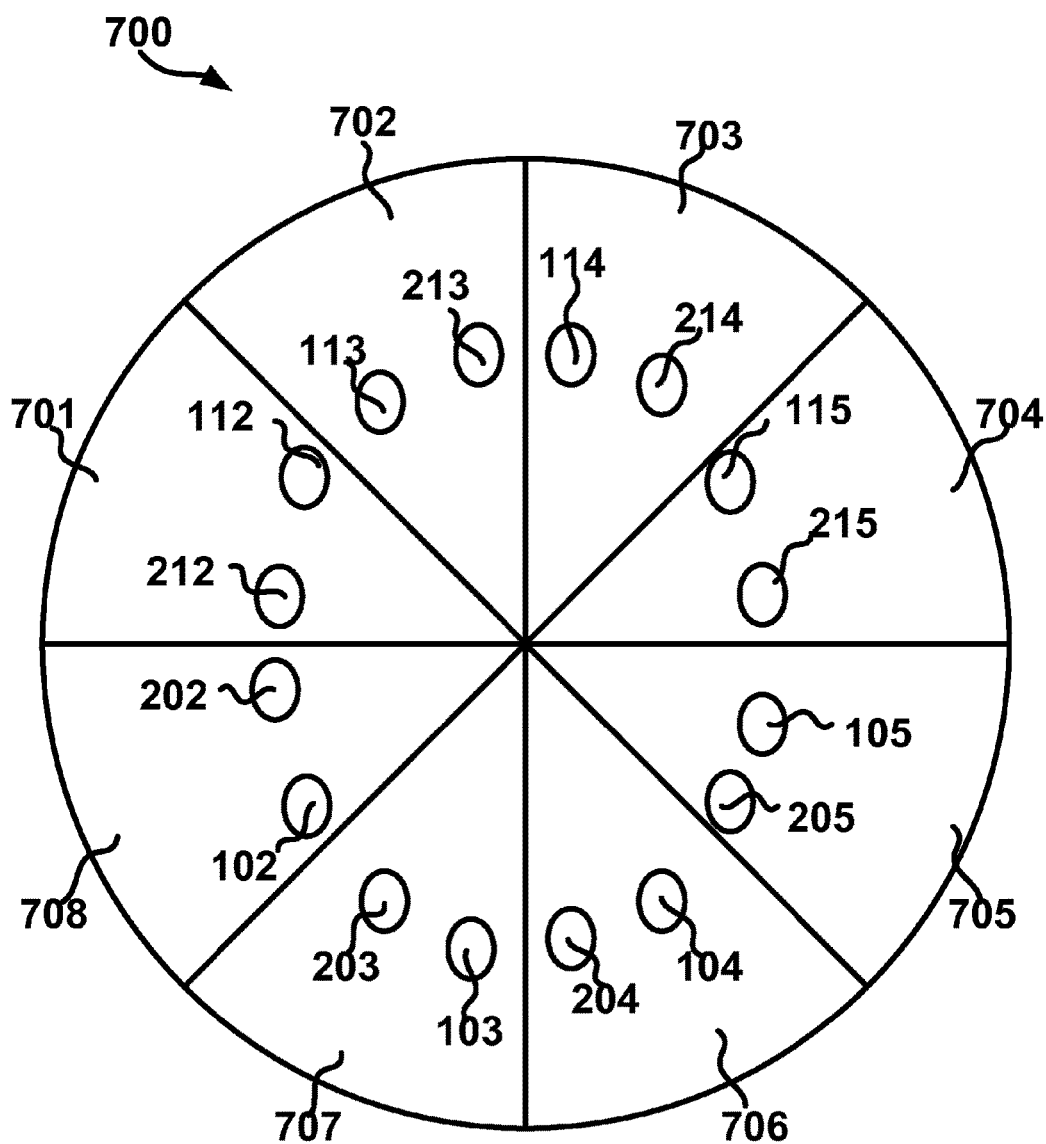
FIG. 7 is a top view diagram of a music-making device according to an example embodiment.

FIG. 7 is a top view diagram of a music making device 700 according to an example embodiment. Device 700 may be a urinal cake holder attachment in one example embodiment. Device 700 may include sensors 102-105 and 112-115. Device 700 may include optional lighting elements 202-205 and 212-215. Sensors 102-105 and 112-115 may be coupled to circuit 128 (not shown in FIG. 7) in any manner discussed herein. Light emitting elements 202-205 and 212-215 may be electrically coupled to circuit 128 (not shown in FIG. 7) in any manner. Device 700 may include eight sections 701-708. Device 700 is depicted as having eight sections, however, any number of sections (1 or more) may be used as long as there is at least one section with at least one sensor disposed on, or at least partially in the section. Each section 701-708 may be substantially optically isolated from all the other section using any method disclosed, taught, or suggested herein. In one example, optical isolation is facilitated through the use of opaque walls. Optical isolation as used herein means that light from one light emitting device does not substantially interfere with light from another light emitting device so that a user may be able to determine when any one light emitting element is turned on.

Figure 8:
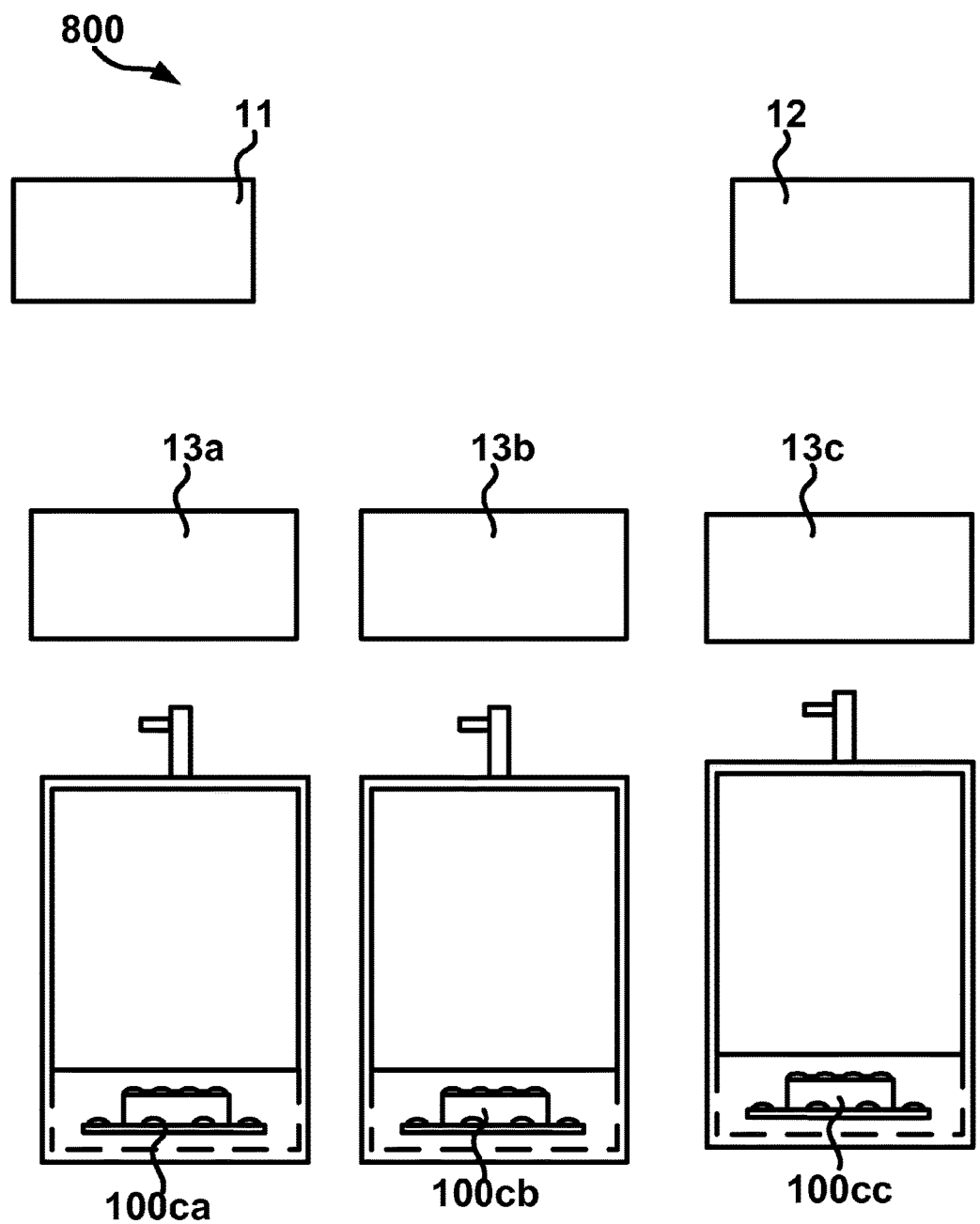
FIG. 8 is a front view diagram of a music-making system according to an example embodiment.

FIG. 8 is a front view diagram of a music making system 800 according to an example embodiment. System 800 can be substantially the same as system 10 except multiple graphic display units 13a, 13b, and 13c, urinals, and music making devices 100ca, 100cb, and 100cc are shown as being included in system 800. The graphic display units 13a, 13b, and 13c may be synchronized or independent. The music making devices 100ca, 100cb, and 100cc may be synchronized or independent. In one example embodiment, music making device 100ca may be operable to create electrical pulses sufficient to create guitar sounds when coupled to a speaker 11 or 12. In another example embodiment, music making device 100cb may be operable to create electrical pulses sufficient to create drum sounds when coupled to a speaker 11 or 12. In one example embodiment, music making device 100cc may create electrical pulses sufficient to create piano sounds when coupled to a speaker 11 or 12. In another example embodiment, music making devices 100ca, 100cb, and 100cc may create electrical pulses sufficient to create guitar, drum, and vocal sounds, respectively, and may, for example, be synchronized to allow three users to simultaneously "play" a song.

Figure 9:
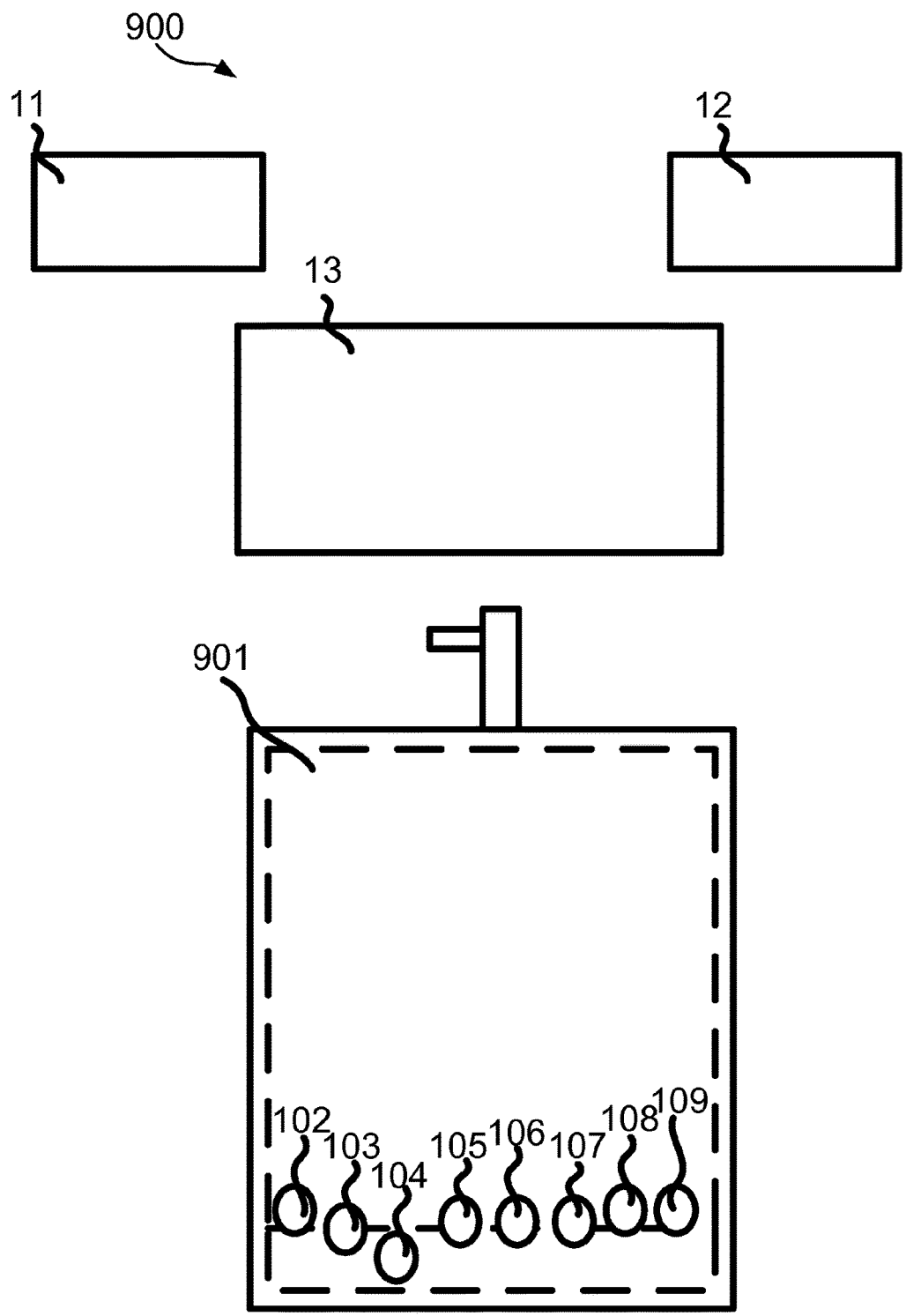
FIG. 9 is a front view diagram of a music-making system according to an example embodiment.

FIG. 9 is a front view diagram of a music making system 900 according to an example embodiment. Music making system 900 may comprise speakers 11 and 12, a graphics display unit 13, a urinal, sensors 102-109, and optional light emitting elements (not shown in FIG. 9). Sensors 102-109 may be disposed anywhere on, or at least partially in, the urinal such that, for example, a user may substantially contact each sensor with a stream of liquid. Care may be taken in the positioning of sensors 102-109 to make them realistically accessible to a stream of liquid and to simultaneously help keep the liquid within the urinal to avoid splashing outside of the urinal. Optional light emitting elements 202-209 (not shown in FIG. 9) may be disposed substantially near sensors 102-109 so as to indicate, by turning the light on, which sensor/s are active. If a user contacts a correct sensor the system may make the correct sound emanate from speakers 11 and 12. Sensors 102-109 and optional light emitting elements may be coupled to circuit 128 (not shown in FIG. 9) in any manner.

Figure 10:
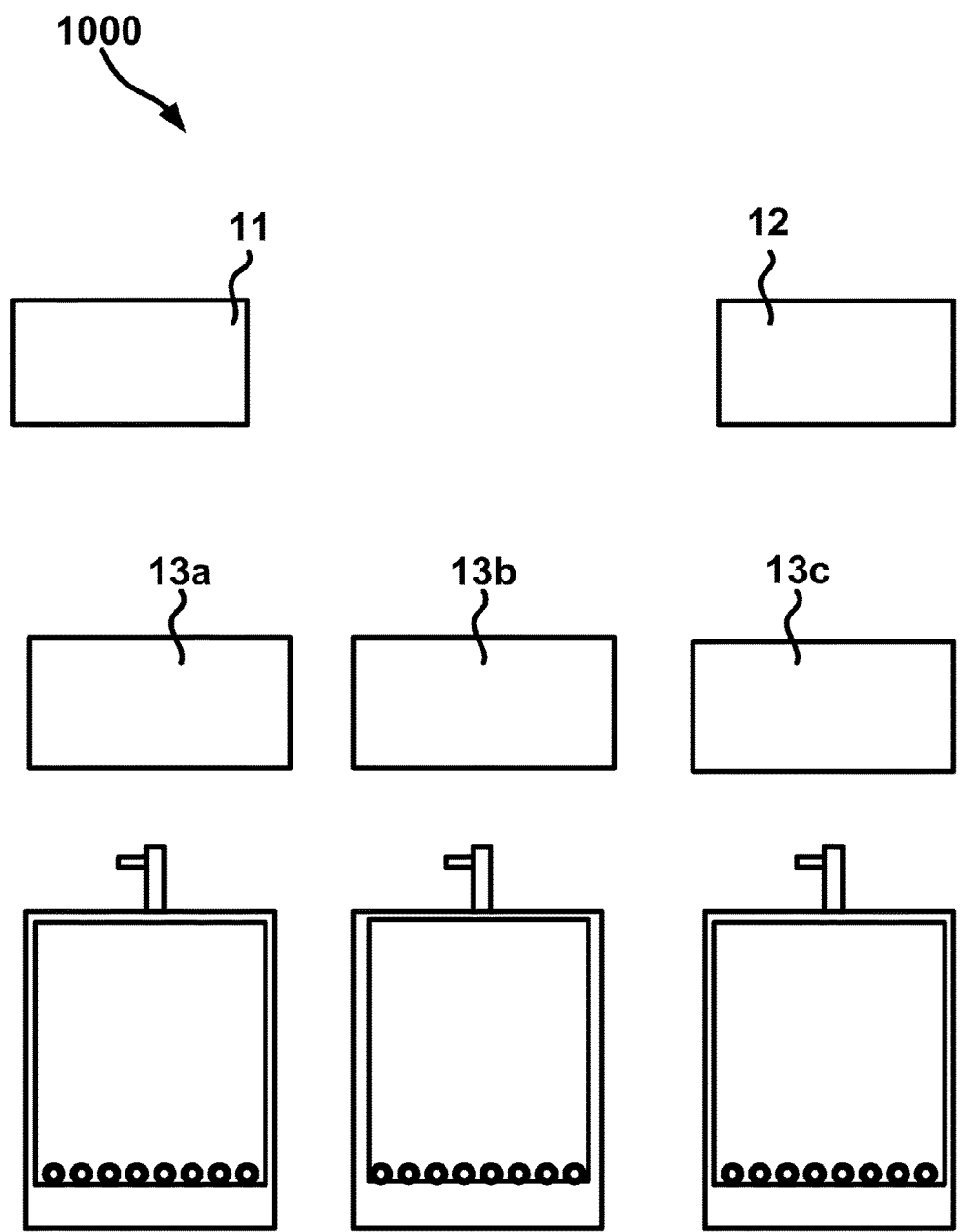
FIG. 10 is a front view diagram of a music-making system according to an example embodiment.

FIG. 10 is a front view diagram of a music making system 1000 according to an example embodiment. Music making system 1000 can be substantially the same as music making system 800 except music making system 1000 uses sensors and optional light emitting elements disposed on, or at least partially in, urinals instead of a modified urinal cake holder.

Figure 11:
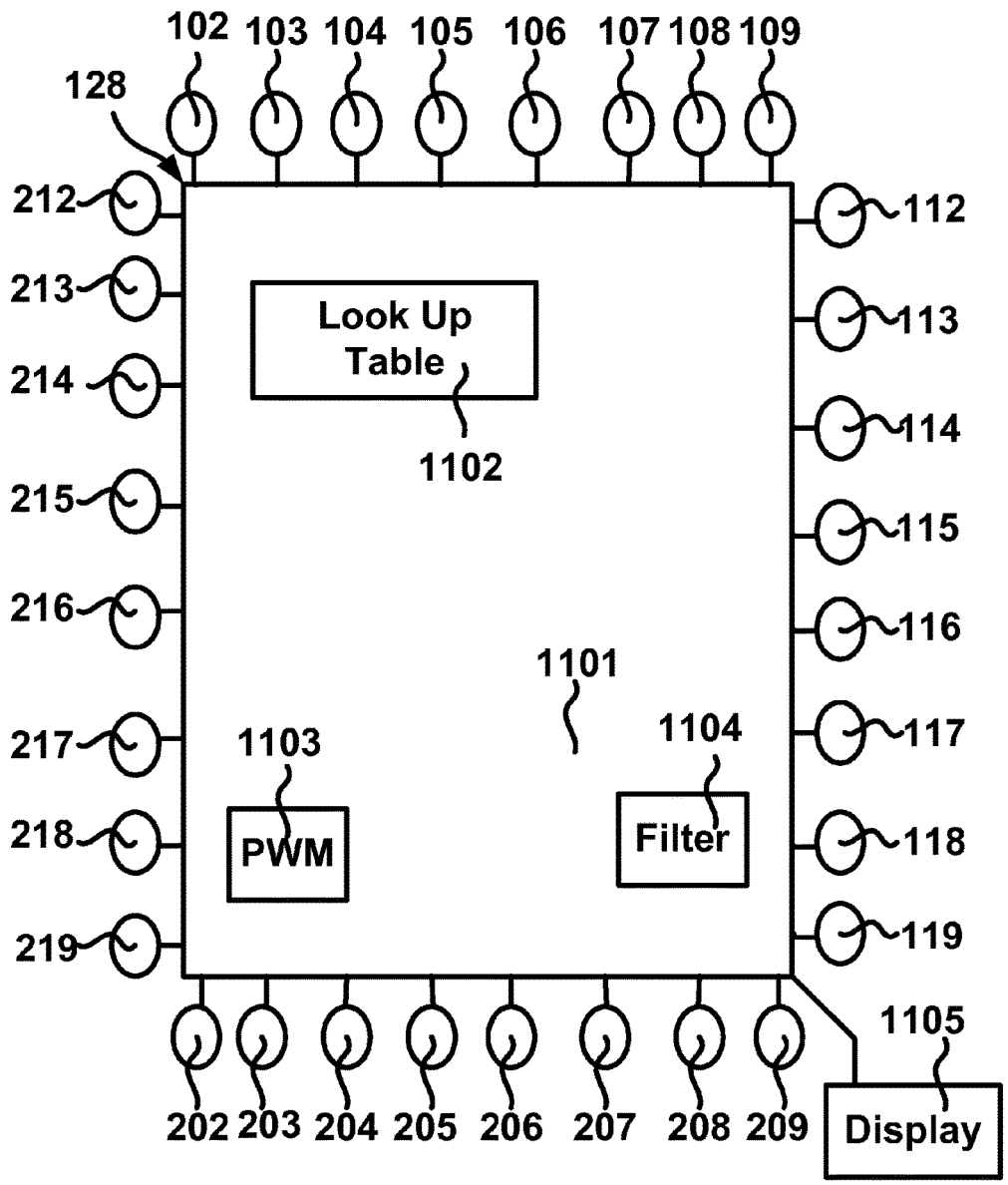
FIG. 11 is a diagram of a music-making circuit according to an example embodiment.

FIG. 11 is a block diagram depiction of a circuit 128 according to an example embodiment. Circuit system 128 may be coupled to sensors 102-109 and 112-119, optional light emitting elements 202-209 and 212-219, speakers 11 and 12 (not shown in FIG. 11), and a graphics display unit 13 (not shown in FIG. 11). Circuit 128 may comprise processing unit 1101. Processing unit 1101 may comprise an optional look up table 1102 of values that may help create electrical pulses that may produce sounds when coupled to speakers 11 and 12. Processing unit 1101 may comprise a pulse width modulator (PWM) 1103 to help create electrical pulses of varying widths that may create sound when coupled to a speaker 11 or 12. Processing unit 1101 may comprise a filter 1104 that may aid in creating electrical pulses that, when coupled to a speaker, help create sounds. Optional lookup table 1102, PWM 1103, and/or filter 1104 may help create electrical pulses that, when coupled to a speaker 11 or 12 create sounds that mimic the sound of an instrument. Instrument as used herein means any device capable to make noise.

Figure 12:
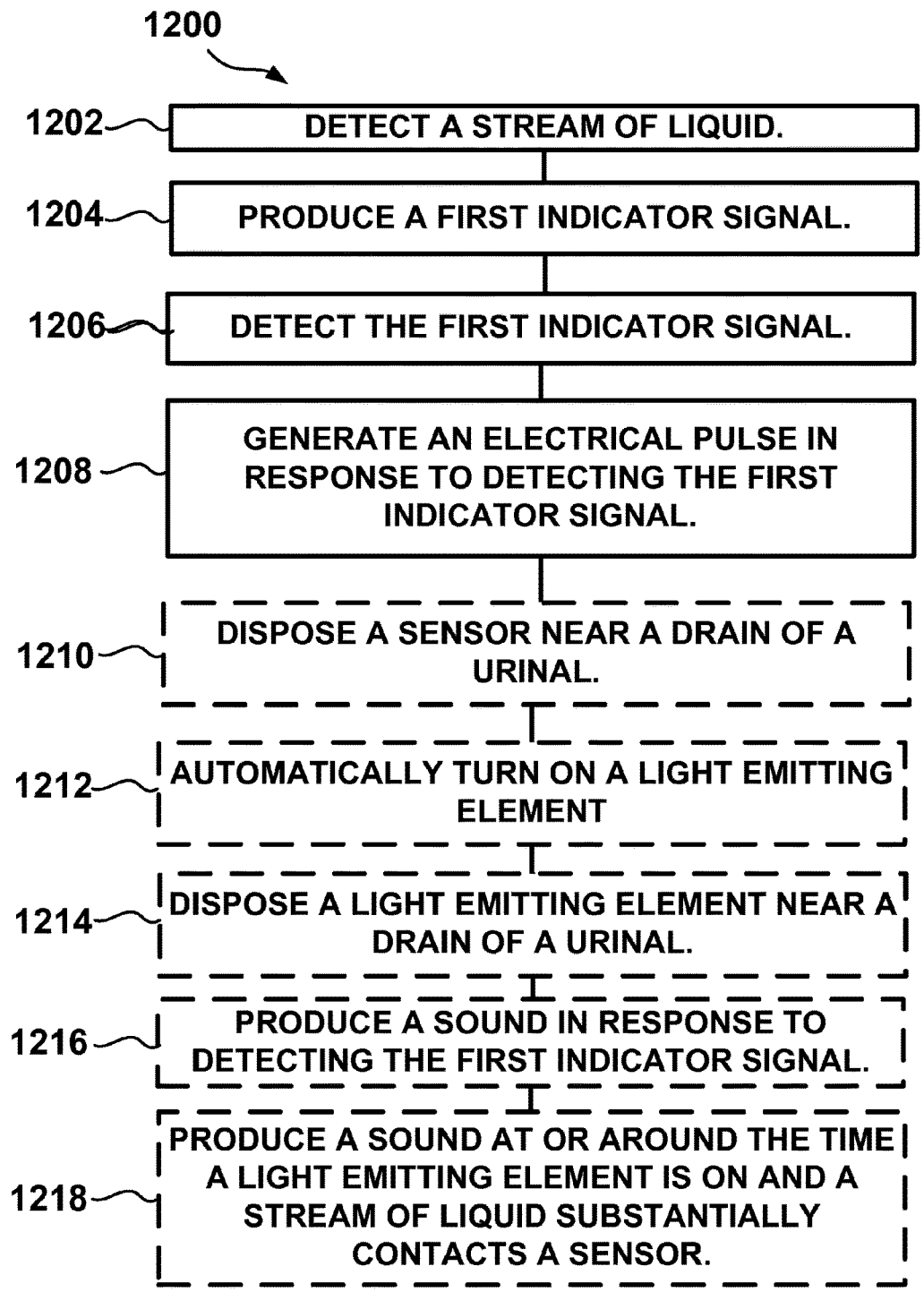
FIG. 12 is a flow diagram of a method according to an example embodiment.

FIG. 12 is a flow diagram depiction of a method 1200 according to an example embodiment. Dashed boxes indicate optional actions. A stream of liquid may be detected at 1202. The detecting may be accomplished using a sensor. An indicator signal may be produced at 1204. The indicator signal may be produced in response to a sensor detecting that a stream of liquid is in substantial contact with the sensor and may be sent, for example, to circuit 128. The indicator signal may be detected at 1206, by circuit 128, for example. The detection may be accomplished using a microcontroller or microprocessor. At 1208 an electrical pulse is generated in response to detecting the indicator signal. The electrical pulse may be generated and then transmitted through an electrical communication between a microprocessor or microcontroller and a filter, PWM, a lookup table, or any combination thereof. At 1210 a sensor is disposed near a drain of a urinal. In one example, the sensor may be a sensor operable to detect when a volume of liquid in contact therewith meets or exceeds a threshold. In another example, the sensor may be a pressure sensor operable to detect when a pressure exerted on the pressure sensor meets or exceeds a threshold. At 1212 a light emitting element may be automatically turned on. In one example, the light emitting element may be turned on using an electrical signal from a microcontroller or microprocessor. In another example, the light emitting element may be turned on to indicate to a user that a specific sensor should be contacted with liquid. A light emitting element is disposed near a drain of a urinal at 1214. In one example, the light emitting element is disposed on, or at least partially in, a urinal. In another example, the light emitting element is disposed on, or at least partially in a music making device created by modifying a urinal cake holder. In another example, the light emitting element may be disposed near a corresponding sensor such that when the light emitting element turns on the light emitting element may indicate that the corresponding sensor should be struck with liquid, that the corresponding sensor was struck with liquid, or both. At 1216 a sound is produced in response at or around the time an indicator signal is detected. The sound may be produced through an electrical communication of an electrical pulse generated by a processing unit and sent to a speaker. At 128 a sound is produced at or around the time a light emitting element is on and a stream of liquid is in substantial contact with a sensor. The sound may be produced through an electrical communication of an electrical pulse generated by a processing unit and sent to a speaker. The method may be accomplished through the use of a first sensor generating a first indicator signal in response to a stream of liquid in substantial contact therewith and a circuit generating a first electrical pulse in response to the first indicator signal, a second sensor generating a second indicator signal in response to a stream of liquid in substantial contact therewith and a circuit generating a second electrical pulse in response to the second indicator signal, etc.

In one or more embodiments a device can include a urinal cake holder, a housing configured to be disposed in the urinal cake holder and configured to contain a circuit, a sensor disposed on the urinal cake holder, the sensor operable to detect when a pressure associated with a stream of liquid in contact therewith exceeds a threshold and emit a first signal in response thereto, and the circuit operable to receive the first signal and produce an electrical pulse in response thereto.

In one or more embodiments a device can include a sensor disposed on a surface of the device, the sensor operable to detect when a pressure associated with a stream of liquid in contact therewith exceeds a threshold and emit a first signal in response thereto, wherein the circuit is operable to receive the first signal and produce an electrical pulse in response thereto, and the device can include a housing configured to contain the circuit and configured to be disposed on a urinal cake holder.

Any systems disclosed, taught, or suggested herein may comprise any music making device disclosed, taught or suggested herein including any modified urinal cake holders and urinal cake holder adapters disclosed, taught, or suggested herein. It should be appreciated that any systems disclosed, taught, or suggested herein may comprise any number of music making devices (1 or more). It should be appreciated that any music making device disclosed, taught, or suggested herein may create electrical pulses which, when coupled to a speaker, may create any sounds including sounds that sound substantially like any musical instrument. It should be appreciated that the figures are merely examples of embodiments of objects and any number of any item shown may be used as long as making music through substantially contacting sensors can still be achieved.

Mode as used herein is any mode where the music making device creates electrical pulses that when coupled to a speaker causes the speaker to create sounds such as notes or chords. As used herein "item" means any object in any of the figures which has a line and a corresponding number associated with it. Any feature of any embodiment discussed herein may be added to any other embodiment disclosed, taught, or suggested herein. While some of the figures depict substantially circularly, and cylindrically shaped music making devices, many other shapes may be used in designing and implementing a music making device. For example squares, cubes, cones, ellipses (two and three dimensional), polygons (two and three dimensional), and many other shapes may be used to design and make operable music making devices. Herein, like items may be labeled with similar numbers. For example, music making device 100*c* may be substantially the same as music making devices 100*ca*, 100*cb*, and 100*cc*, among others. Herein, electrical coupling and coupling include both wired and wireless electrical couplings. The terminology used herein is for the purpose of describing particular aspects only and is not intended to be limiting of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features. integers. steps. operations, elements, components, and/or groups thereof.

What is claimed is:
1. A system, comprising:
a first sensor operable to determine that a stream of liquid in contact therewith meets or exceeds a first threshold and emit a first signal, wherein the first sensor is associated with a device configured to be disposed in a human waste receptacle;
a second sensor associated with the device and operable to determine that the stream of liquid in contact therewith meets or exceeds a second threshold and emit a second signal;

a circuit electrically coupled with the first and second sensors, wherein the circuit is operable to:
  generate a first electrical pulse in response to receiving the first signal; and
  generate a second electrical pulse in response to receiving the second signal; and
a user interface configured to:
  receive the first and second electrical pulses; and
  inform a user of a number of times the stream of liquid in contact with the first and second sensors respectively exceeded the first and second thresholds over a particular time period.

2. The system of claim 1, wherein the system includes a display.

3. The system of claim 2, wherein the display is configured to display an indication associated with the stream of liquid meeting or exceeding at least one of the first threshold and the second threshold.

4. The system of claim 1, wherein the circuit is coupled to a speaker and the combination is operable to generate sounds that substantially mimic a sound of a musical instrument.

5. The system of claim 1, wherein the system includes a light emitting element.

6. The music making system of claim 5, wherein the light emitting element is coupled to the circuit, wherein the circuit is operable to turn the light emitting element on and off, and wherein at or around the time the light emitting element is on and the stream of liquid in contact with the first sensor meets or exceeds the first threshold a sound is generated.

7. A method of making music comprising:
  detecting, using a first sensor of a system, a stream of liquid;
  producing, using the first sensor, a first indicator signal in response to detecting the stream of liquid;
  detecting, using a circuit of the system, the first indicator signal;
  generating, using the circuit, an electrical pulse in response to detecting the first indicator signal; and
  informing a user, via a user interface, of a number of times the stream of liquid was detected over a particular time period.

8. The method of claim 7, wherein the method includes:
  detecting, using a second sensor, the stream of liquid;
  producing, using the second sensor, a second indicator signal in response to detecting the stream of liquid;
  detecting, using the circuit, the second indicator signal; and
  generating, using the circuit, a second electrical pulse in response to detecting the second indicator signal.

9. The method of claim 7, wherein the method includes producing a sound using a speaker coupled to the circuit.

10. The method of claim 7, wherein the sound is a pre-recorded sound, and wherein the pre-recorded sound is recorded using the system.

11. The method of claim 8, wherein the first sensor is associated with a first one of a plurality of light emitting elements, wherein the second sensor is associated with a second one of the plurality of light emitting elements, and wherein the method includes illuminating the first one of the plurality of light emitting elements responsive to detecting the stream of liquid using the first sensor and illuminating the second one of the plurality of light emitting elements responsive to detecting the stream of liquid using the second sensor.

12. The method of claim 8, wherein the first sensor is associated with a first one of a plurality of light emitting elements, wherein the second sensor is associated with a second one of the plurality of light emitting elements, and wherein the method includes extinguishing the first one of the plurality of light emitting elements responsive to detecting the stream of liquid using the first sensor and extinguishing the second one of the plurality of light emitting elements responsive to detecting the stream of liquid using the second sensor.

* * * * *